United States Patent [19]

Yamane et al.

[11] 4,363,903

[45] Dec. 14, 1982

[54] VINYL CHLORIDE COPOLYMER AND COMPOSITION CONTAINING THE SAME

[75] Inventors: Kazumasa Yamane, Kobe; Masahiro Kobayashi, Amagasaki; Masahiko Takada, Akashi, all of Japan

[73] Assignee: Kanegafuchi Kagaku Kogyo Kabushiki Kaisha, Osaka, Japan

[21] Appl. No.: 210,858

[22] Filed: Nov. 26, 1980

[30] Foreign Application Priority Data

Nov. 30, 1979 [JP] Japan .................................. 54-155874
Dec. 4, 1979 [JP] Japan .................................. 54-157296

[51] Int. Cl.³ ...................... C08F 24/00; C08F 236/00
[52] U.S. Cl. .................................... 526/273; 526/336; 526/338
[58] Field of Search ............... 526/273, 338, 340.3, 526/335, 336

[56] References Cited

U.S. PATENT DOCUMENTS

| | | | |
|---|---|---|---|
| 2,915,494 | 12/1959 | Snoddon | 526/273 |
| 3,082,197 | 3/1963 | Witt | 526/335 |
| 3,095,406 | 6/1963 | Short et al. | 526/335 |
| 3,763,123 | 10/1973 | Waterman et al. | 526/338 |

Primary Examiner—Harry Wong, Jr.
Attorney, Agent, or Firm—Armstrong, Nikaido, Marmelstein & Kubovcik

[57] ABSTRACT

A copolymer comprising (a) vinyl chloride or a mixture of vinyl chloride and a monomer copolymerizable therewith and (b) 1,2-polybutadiene oligomer and/or epoxidized 1,2-polybutadiene oligomer. The plasticized copolymer can be molded into soft moldings having a low compression set and high tensile and tear strengths. Also, by the incorporation of the copolymer into vinyl chloride homopolymer or copolymers, hard moldings having delustered surface can be obtained without conducting delustering operation.

1 Claim, No Drawings

VINYL CHLORIDE COPOLYMER AND COMPOSITION CONTAINING THE SAME

BACKGROUND OF THE INVENTION

The present invention relates to a novel vinyl chloride copolymer and a vinyl chloride copolymer composition, and more particularly to a copolymer of vinyl chloride or a monomer mixture containing vinyl chloride with 1,2-polybutadiene oligomer and/or epoxidized 1,2-polybutadiene oligomer, and a composition containing the vinyl chloride copolymer.

Polyvinyl chloride is employed widely, since it is inexpensive as compared with other synthetic resins and moldings made thereof have various excellent physical properties. Plasticization of polyvinyl chloride by the addition of a plasticizer is a well known technique for providing soft and rubber-like articles. However, usual plasticized polyvinyl chlorides cannot be employed in a field requiring a low compression set, e.g. packings, since it is impossible to lower the compression set of moldings. Accordingly, various improvements of polyvinyl chloride have been attempted for lowering the compression set. One of these attempts is the improvement based on cross-linking techniques by copolymerization of vinyl chloride with a cross-linking agent, e.g. (1) copolymerization of vinyl chloride with a divinyl compound such as butadiene, isoprene or divinylbenzene, (2) copolymerization of vinyl chloride with a diallyl compound such as diallyl phthalate or diallyl maleate, (3) copolymerization of vinyl chloride with a dimethacrylate such as diethylene glycol dimethacrylate, and (4) copolymerization of vinyl chloride with a 2,5-divinyltetrahydropyran derivative. However, the cross-linked polymers obtained by such a copolymerization have high melting points and do not melt with ease, and as a result, the unmolten fine polymer particles remain in the obtained moldings, resulting in lowering of tensile strength due to stress concentration to that portion. This tendency is particularly noticeable in plasticized resin systems with a plasticizer. The preparation of the above-mentioned cross-linked polymers has been scarcely practiced industrially, because the cross-linked polymers have the defect as mentioned above.

It is an object of the present invention to provide a vinyl chloride copolymer which can be molded into articles having excellent creep characteristics, particularly having a low compression set.

A further object of the present invention is to provide a vinyl chloride copolymer which has a good processability and gives flexible moldings having excellent creep characteristics, particularly a low compression set, without lowering a tensile strength.

Another object of the present invention is to provide a vinyl chloride copolymer composition capable of giving soft moldings having excellent creep characteristics, particularly a low compression set, without lowering a tensile strength.

A further object of the present invention is to provide a vinyl chloride copolymer composition capable of giving hard moldings having a delustered surface without conducting a delustering operation.

These and other objects of the present invention will become apparent from the description hereinafter.

SUMMARY OF THE INVENTION

In accordance with the present invention, there is provided a copolymer comprising (a) vinyl chloride or a mixture of vinyl chloride and a monomer copolymerizable therewith and (b) a compound having the following general formula:

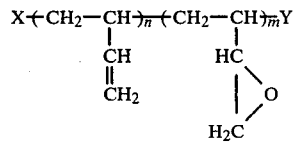

wherein X and Y are hydrogen atom, hydroxyl group or carboxyl group, n is an integer of 2 to 100, and m is 0 or an integer of 1 to 80.

The vinyl chloride copolymer of the present invention can give soft moldings having a compression set of not more than 50% and moreover having a high tensile strength and a high tear strength, and also exhibits a delustering effect in the preparation of hard moldings, when vinyl chloride resins are used in combination therewith.

DETAILED DESCRIPTION

The vinyl chloride copolymer of the present invention has a cross-linked structure and, therefore, a molding made of the copolymer has excellent creep characteristics and the compression set is low. Moreover, since the compound shown by the above-mentioned general formula is an oligomer, the distance between the cross-linked points is longer than the case of using polyfunctional monomers as cross-linking agents and the copolymer of the invention is superior in flexuosity of the molecule. Accordingly, the copolymer of the invention is easy to melt and is readily processed. Moldings prepared from the copolymer of the invention have a low compression set and a high tensile and tear strengths, and according to the present invention, it is possible to obtain excellent moldings inconceivable from moldings made of cross-linked copolymers using conventional cross-linking agents.

In the present invention, vinyl chloride alone or a mixture of vinyl chloride and a monomer copolymerizable with vinyl chloride is employed as a monomer (a) for forming the main chain of the copolymer of the invention. It is desirable that the mixture contains at least 50% by weight of vinyl chloride. Examples of the monomer copolymerizable with vinyl chloride are vinyl esters such as vinyl acetate, vinyl ethers such as methyl vinyl ether, acrylic acid and its esters, methacrylic acid and its esters, maleic acid and its esters and anhydride, fumaric acid and its esters and anhydride, aromatic vinyl compounds, vinylidiene halides and monoolefines.

Compounds having the following general formula:

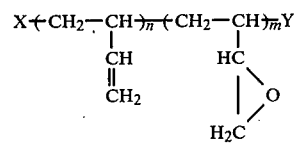

wherein X and Y are hydrogen atom, hydroxyl group or carboxyl group, n is an integer of 2 to 100, and m is 0 or an integer of 1 to 80 are employed as a cross-linking agent (b) in the present invention. These compounds are 1,2-polybutadiene oligomers and epoxidized 1,2-polybutadiene oligomers, and typical examples of such a compound (b) copolymerized with the monomer (a)

are 1,2-polybutadiene oligomer, epoxidized 1,2-polybutadiene oligomer containing 7.8% by weight of oxirane oxygen, epoxidized 1,2-polybutadiene oligomer containing 3.8% by weight of oxirane oxygen, acrylate-modified polybutadiene, and mixtures thereof. The oligomers may contain a small amount of 1,4-polybutadiene or a solvent. The use of a large amount of the compound (b) results in lowering of the tensile strength of the obtained copolymer and is also undesirable from economical point of view in the preparation. Also, when the amount of the compound (b) used is too small, the formation of the cross-linked structure is insufficient and, therefore, the creep characteristics are not sufficiently improved. From these points of view, the compound (b) is employed in an amount of 0.001 to 10 parts, preferably 0.01 to 1 part by weight, per 100 parts by weight of the monomer (a).

The copolymerization may be carried out in any conventionally known manners such as bulk polymerization, suspension polymerization, emulsion polymerization and solution polymerization. A suspension polymerization is preferred from viewpoints of easiness and cost in preparation.

As a dispersing agent employed in the copolymerization by means of suspension polymerization, there are employed known dispersing agents such as organic high polymer dispersing agents, e.g. partially hydrolyzed polyvinyl acetate, methyl cellulose, hydroxymethyl cellulose and gelatin, and inorganic dispersing agents, e.g. talc, bentonite and barium sulfate. The dispersing agents may be employed alone or in admixture thereof.

Any known oil-soluble radical polymerization initiators are employed in the copolymerization. Examples of the polymerization initiator are organic peroxides such as lauroyl peroxide, diisopropyl peroxydicarbonate, isobutylyl peroxide and di-2-ethylhexyl peroxydicarbonate, and azo compounds such as azobisisobutyronitrile and azobisvaleronitrile.

The polymerization is usually carried out at a temperature of 20° to 80° C. When the polymerization temperature is lower than 20° C., decomposition rate of the polymerization initiator is slow, and as a result, the polymerization time becomes long and the producibility is decreased. When the polymerization temperature is higher than 80° C., the effect on the improvement of the creep characteristics is small.

The vinyl chloride copolymer of the present invention contains 90 to 99.999% by weight of the units of the monomer (a) and 10 to 0.001% by weight of the units of the compound (b). The vinyl chloride copolymer of the present invention is admixed with a plasticizer, and if necessary, further with other additives, and is molded into various articles in a conventional manner. The composition of the present invention containing the vinyl chloride copolymer and a plasticizer is industrially very useful in that it provides a molding having a compression set of not more than 50% and a tensile strength of not less than 1.30 kg./mm². Also, the copolymer of the invention has the features that it stands comparison with usual vinyl chloride resin in processability such as extrusion or injection molding or calendering and also it produces an excellent delustering effect in the preparation of hard polyvinyl chloride moldings.

The values of the compression set as shown herein are those measured according to Japanese Industrial Standard (hereinafter referred to as "JIS") K 6301 at 70° C. under a compression of 25% for 22 hours, and the values of the tensile strength as shown herein are those measured according to JIS K 6723 at 25° C. at a tensional speed of 200 mm./minute.

In the preparation of the composition of the invention, the amount of a plasticizer added to the vinyl chloride copolymer to soften the obtained moldings varies depending on the uses of the moldings. The use of a plasticizer in too much amount is not desirable in points of processability and practicability, since the copolymer particles mixed with the plasticizer do not dry up and also the obtained moldings bleed the plasticizer and become sticky. On the other hand, when the amount of the plasticizer is too small, the obtained moldings are poor in elasticity and become hard. Accordingly, the plasticizer is usually employed in an amount 25 to 200 parts by weight per 100 parts by weight of the copolymer.

Any known plasticizers may be employed in the present invention. Typical examples of the plasticizer are alkyl esters of aromatic polybasic acids such as dibutyl phthalate, dioctyl phthalate and butylbenzyl phthalate, alkyl esters of aliphatic polybasic acids such as dioctyl adipate, dioctyl azelate and dioctyl sebacate, and alkyl esters of phosphoric acid such as tricresyl phosphate.

The vinyl chloride copolymer composition of the present invention may contain other thermoplastic resins, rubbers and additives such as thermal stabilizer, filler, pigment, flame retarder, foaming agent, lubricant, modifier and processing aid.

The vinyl chloride copolymer of the present invention can exhibit an excellent delustering effect in the field of hard polyvinyl chloride, when it is added to conventionally used vinyl chloride homopolymer or copolymers. Therefore, by the use of the copolymer of the invention, it is possible to easily obtain hard moldings having the dull surface without conducting conventional delustering operation such as embossing. It is also possible to freely control the surface roughness of moldings by varying the ratio of the copolymer of the invention to the vinyl chloride homopolymer or copolymers, and the desired roughness can be provided on the surface of moldings. The ratio of the copolymer of the invention to the vinyl chloride homopolymer or copolymers is usually selected from 5 to 80:95 to 20 by weight. The vinyl chloride copolymers to be incorporated with the copolymer of the present invention include vinyl chloride-vinyl acetate copolymer, vinyl chloride-acrylate copolymer, vinyl chloride-methacrylate copolymer, vinyl chloride-ethylene copolymer, vinyl chloride-alkyl vinyl ether copolymer and vinyl chloride-propylene copolymer.

The present invention is more particularly described and explained by means of the following Examples, in which all parts are parts by weight. These Examples are intended to illustrate the invention and are not to be construed to limit the scope of the invention.

In the following Examples and Comparative Examples, physical properties were measured as follows:

(1) Preparation of Test Specimen

A resin and additives were blended according to the formulation shown in the following Table 1, and the mixture was kneaded by rolls at 185° C. for 10 minutes and was formed into a sheet having a thickness of about 0.7 mm. The sheet was pressed at 190° C. under a pressure of 200 kg./cm.² to give a press sheet to be subjected to the measurement of physical properties.

TABLE 1

| Component | Part by weight |
| --- | --- |
| Resin | 100 |
| Dioctyl phthalate | 100 |
| Tribasic lead sulfate | 3 |
| Lead stearate | 1 |
| Calcium carbonate | 30 |

(2) Gel Fraction

Test specimen was extracted with hot tetrahydrofuran for 22 hours by employing Soxhlet extracter, and was filtered by a 350 mesh filter. The gel fraction was obtained from the weight of the extraction residue separated by the filtration.

(3) Compression Set

The measurement was conducted by maintaining test specimen at 70° C. under a compression of 25% for 22 hours, allowing to stand at room temperature for 30 minutes and measuring the thickness of the specimen at room temperature according to JIS K 6301.

(4) Tensile Strength

According to JIS K 6723, the press sheet was punched to give test specimens, and the measurement was conducted by employing a tensile tester at 25° C. at a tensional speed of 200 mm./min.

(5) Tear Strength

According to JIS K 6301, the press sheet was punched to give test specimens, and the measurement was conducted by employing a tensile tester at 25° C. at a tensional speed of 500 mm./min.

EXAMPLES 1 TO 6 AND COMPARATIVE EXAMPLE 1

A 300 liter stainless steel polymerization vessel was charged with 200 parts of demineralized and deoxidized water, 0.2 part of partially hydrolyzed polyvinyl acetate, 0.6 part of diisopropyl peroxide, 0.06 part of di-2-ethylhexyl peroxydicarbonate, 100 parts of vinyl chloride and a prescribed amount as shown in Table 2 of partially epoxidized 1,2-polybutadiene oligomer containing 7.8% by weight of oxirane oxygen. The polymerization was carried out at 35° C. for 15 hours. The obtained slurry was dehydrated, and was dried in a hot air drier at 55° C. for 18 hours for subjecting to the measurement of physical properties.

The results are shown in Table 2.

From Table 2, it is observed that the compression set is remarkably improved as compared with vinyl chloride homopolymer of Comparative Example 1 and that the tensile strength and tear strength can be increased by controlling the gel fraction.

COMPARATIVE EXAMPLES 2 TO 7

The procedures of the preceding Examples were repeated except that the cross-linking agents shown in Table 2 were employed instead of the partially epoxidized 1,2-polybutadiene oligomer.

The results are shown in Table 2.

From Table 2, it is observed that the tensile and tear strengths of the copolymers obtained in Comparative Examples by using conventional polyfunctional monomers as cross-linking agents greatly decrease with formation of gel portion, whereas the decrease of the tensile and tear strengths of the copolymer of the present invention is a very little and the compression set and the tensile and tear strengths are well balanced.

TABLE 2

| | Cross-linking agent | | Gel fraction % | Compression set % | Tensile strength kg./mm.$^2$ | Tear strength kg./mm.$^2$ |
| --- | --- | --- | --- | --- | --- | --- |
| | Kind | Amount part | | | | |
| Com. Ex. 1 | — | | 0.00 | 0 | 53.0 | 1.55 | 30.0 |
| Ex. 1 | Epoxidized 1,2-polybutadiene oligomer | 0.13 | 2 | 50.0 | 1.65 | 31.0 |
| Ex. 2 | Epoxidized 1,2-polybutadiene oligomer | 0.20 | 23 | 50.0 | 1.65 | 29.5 |
| Ex. 3 | Epoxidized 1,2-polybutadiene oligomer | 0.35 | 50 | 49.1 | 1.65 | 26.0 |
| Ex. 4 | Epoxidized 1,2-polybutadiene oligomer | 0.50 | 66 | 48.2 | 1.50 | 24.0 |
| Ex. 5 | Epoxidized 1,2-polybutadiene oligomer | 0.80 | 79 | 47.8 | 1.45 | 22.0 |
| Ex. 6 | Epoxidized 1,2-polybutadiene oligomer | 0.85 | 86 | 47.1 | 1.35 | 19.0 |
| Com. Ex. 2 | Diallyl phthalate | 0.35 | 65 | 49.2 | 1.10 | 16.0 |
| Com. Ex. 3 | Diallyl maleate | 0.5 | 54 | 49.9 | 1.25 | 19.5 |
| Com. Ex. 4 | Triallyl cyanurate | 0.2 | 58 | 50.2 | 1.20 | 20.0 |
| Com. Ex. 5 | Triallyl isocyanurate | 0.2 | 65 | 49.5 | 1.00 | 19.5 |
| Com. Ex. 6 | 2,5-divinyltetrahydropyran | 0.2 | 62 | 50.5 | 1.35 | 20.5 |
| Com. Ex. 7 | Octadecane divinyl ether | 1.0 | 41 | 54.2 | 1.35 | 21.5 |

EXAMPLES 7 TO 18

The procedures of the preceding Examples were repeated except that various 1,2-polybutadiene oligomers shown in Table 3 were employed.

The results are shown in Table 3.

As is clear from Table 3, it is possible to prepare vinyl chloride polymers showing a compression set of not more than 50% and a tensile strength of 1.30 kg./mm.$^2$ according to the present invention. On the other hand, it is clear from Table 2 that in case of vinyl chloride homopolymer in Comparative Example 1, the tensile strength is high, i.e. 1.55 kg./mm.$^2$, but the compression set is higher than 50%, and that in case of the copolymers obtained in Comparative Examples 2 to 7 by employing polyfunctional monomers as cross-linking agents, some of them show a compression set of not more than 50%, but the tensile strength is low, and also the compression set of the copolymers showing a tensile strength of 1.35 kg./mm.$^2$ is higher than 50%.

TABLE 3

| Ex. No. | 1,2-Polybutadiene Kind | Amount part | Compression set % | Tensile strength kg./mm.$^2$ | Note |
|---|---|---|---|---|---|
| 7 | 4.2% BF-1000 | 0.30 | 48 | 1.55 | * |
| 8 | 3.8% BF-1000 | 0.30 | 48 | 1.60 | * |
| 9 | TE-2000 | 0.25 | 47 | 1.50 | ** |
| 10 | B-1000 | 0.25 | 49 | 1.55 | ** |
| 11 | B-2000 | 0.25 | 48 | 1.60 | ** |
| 12 | B-3000 | 0.25 | 47 | 1.65 | ** |
| 13 | B-4000 | 0.25 | 47 | 1.65 | ** |
| 14 | G-1000 | 0.25 | 47 | 1.55 | ** |
| 15 | G-2000 | 0.25 | 48 | 1.60 | ** |
| 16 | G-3000 | 0.25 | 47 | 1.65 | ** |
| 17 | C-1000 | 0.25 | 47 | 1.55 | ** |
| 18 | C-2000 | 0.25 | 47 | 1.60 | ** |

(Note)
*Epoxidized 1,2-polybutadiene containing 4.2% or 3.8% by weight of oxirane oxygen (commercial name "BF-1000" made by Adeka Argus Chemical Co., Ltd.)
**1,2-Polybutadiene (registered trademark "NISSOPB" made by Nippon Soda Co., Ltd.)

EXAMPLES 19 TO 23 AND COMPARATIVE EXAMPLE 8

To 100 parts of a resin mixture consisting of 30 parts of each of the resins obtained in Examples 1 to 5 and 70 parts of vinyl chloride homopolymer having an average degree of polymerization of 700 were added 2 parts of a tin stabilizer, 0.5 part of stearic acid and 0.5 part of a pigment. The mixture was kneaded by rolls at 180° C. for 7 minutes, and was formed into a roll sheet having a thickness of 0.6 mm. The surface of the roll sheet was observed to estimate the delustered state and the state of roughness.

As comparison, the above procedure was repeated except that the same vinyl chloride homopolymer as above was employed in an amount of 100 parts instead of 100 parts of the resin mixture.

The results are shown in Table 4.

TABLE 4

|  | Delustering | Roughness |
|---|---|---|
| Ex. 19 | slightly good | slightly smooth |
| Ex. 20 | good | good |
| Ex. 21 | good | good |
| Ex. 22 | very good | good |
| Ex. 23 | very good | good |
| Com. Ex. 8 | bad (lustrous) | smooth |

EXAMPLES 24 TO 30 AND COMPARATIVE EXAMPLE 9

The resin obtained in Example 7 was mixed with vinyl chloride-vinyl acetate copolymer having an average degree of polymerization of 700 and a vinyl acetate content of 8% by weight in a proportion as shown in Table 5, and to 100 parts of the obtained resin mixture were added 2 parts of a tin stabilizer, 0.5 part of stearic acid and 0.5 part of a pigment. The mixture was kneaded by rolls at 180° C. for 7 minutes and was formed into a roll sheet having a thickness of 0.6 mm. The surface of the roll sheet was observed to estimate the delustered state and the state of roughness.

As comparison, the above procedure was repeated except that the same vinyl chloride-vinyl acetate copolymer as above was employed in an amount of 100 parts instead of 100 parts of the resin mixture.

The results are shown in Table 5.

TABLE 5

|  | Resin of Ex. 7 | VCl-VAc* copolymer | Delustering | Roughness |
|---|---|---|---|---|
| Ex. 24 | 5 | 95 | lustrous | slightly smooth |
| Ex. 25 | 10 | 90 | slightly lustrous | slightly smooth |
| Ex. 26 | 20 | 80 | good | good |
| Ex. 27 | 30 | 70 | good | good |
| Ex. 28 | 50 | 50 | good | good |
| Ex. 29 | 70 | 30 | good | slightly rough |
| Ex. 30 | 80 | 20 | good | slightly rough |
| Com. Ex. 9 | 0 | 100 | lustrous | smooth |

(Note)
*VCl-VAc shows vinyl chloride-vinyl acetate copolymer.

As is clear from Table 4, moldings having a surface of good delustered, rough state can be obtained by incorporating the copolymer of the present invention into vinyl chloride homopolymer. Also, as is clear from Table 5, the surface roughness of moldings can be freely controlled, while maintaining the delustered state, by changing the proportion of the copolymer of the invention to vinyl chloride-vinyl acetate copolymer.

What we claim is:

1. A copolymer prepared by polymerizing a reaction system comprising a mixture of monomeric components (a) vinyl chloride or a mixture of at least 50% by weight vinyl chloride and a monomer copolymerizable therewith and (b) 0.001 to 10 parts by weight per 100 parts by weight of the monomeric component (a) of a compound having the following general formula:

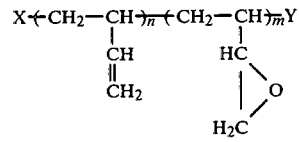

wherein X and Y are independently hydrogen, hydroxyl or carboxyl, n is an integer of 2 to 100 and m is 0 or an integer of 1 to 80, the polymerization being carried out employing a free-radical polymerization initiator.

* * * * *